Figure 1:
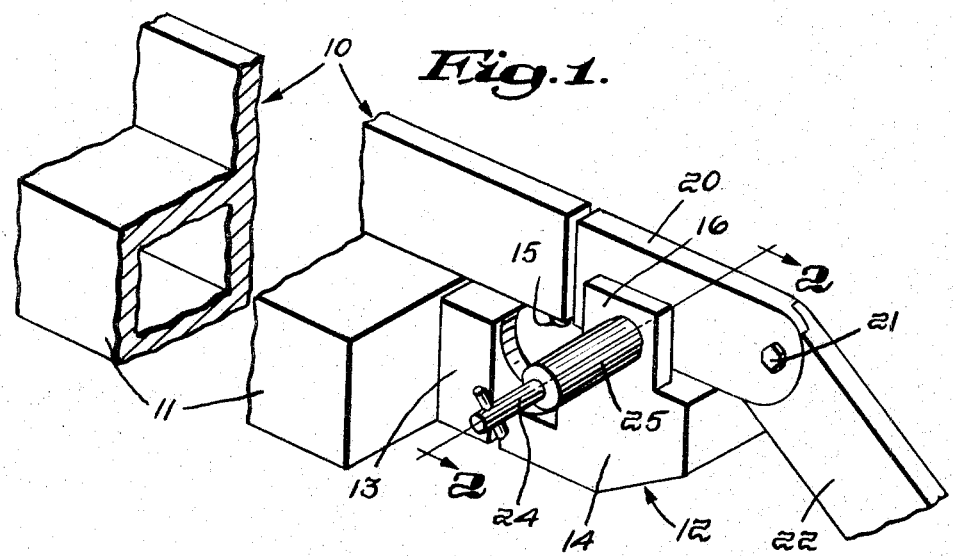

Aug. 22, 1967  J. W. O'DONNELL  3,336,877
TROLLEY TRANSFER APPARATUS BETWEEN INDEPENDENT
OVERHEAD RAIL SYSTEMS
Filed June 30, 1965
2 Sheets-Sheet 1

Inventor:
James W. O'Donnell,
by Abh Wien
Attorney

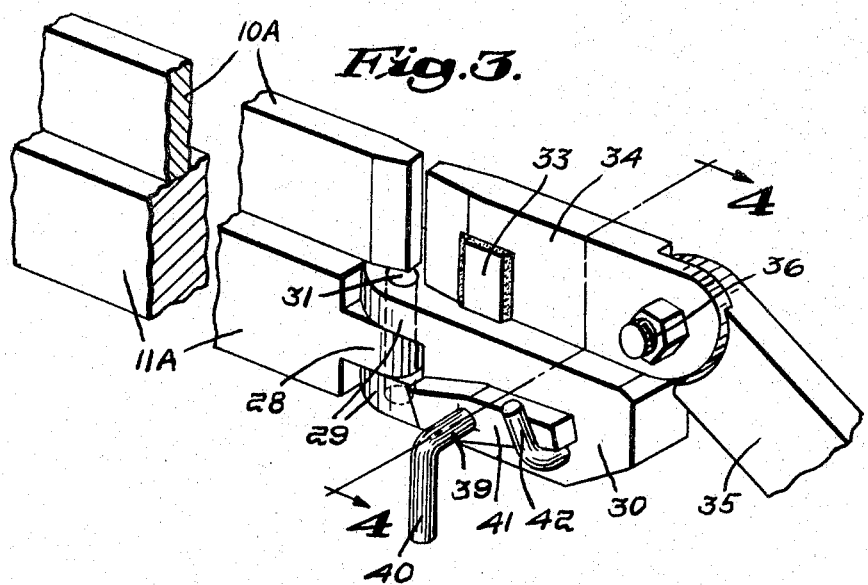
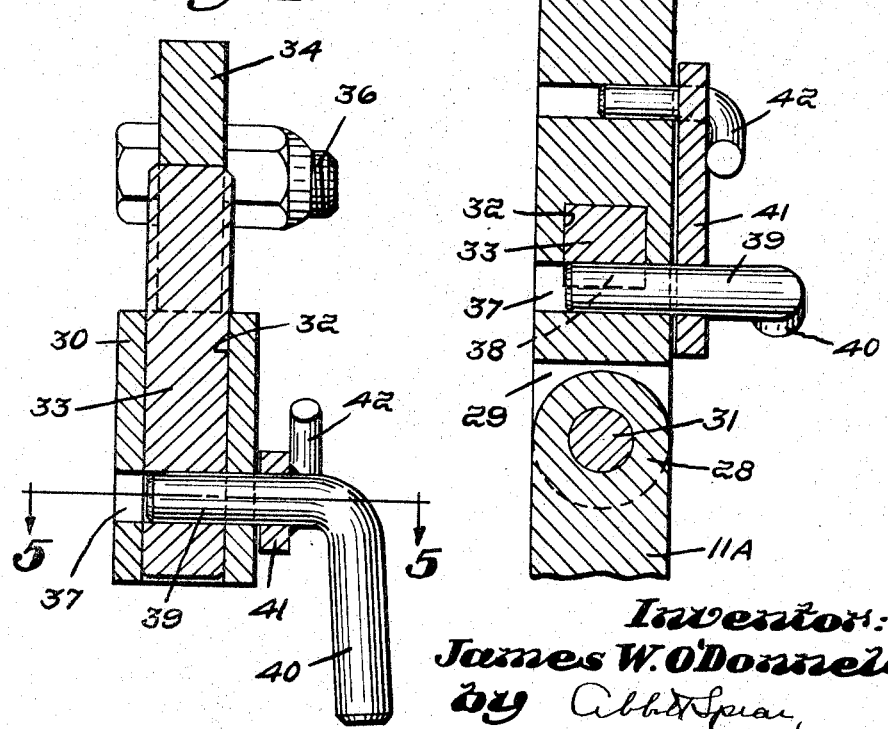

United States Patent Office 3,336,877
Patented Aug. 22, 1967

3,336,877
TROLLEY TRANSFER APPARATUS BETWEEN INDEPENDENT OVERHEAD RAIL SYSTEMS
James W. O'Donnell, Main St., Plympton, Mass. 02367
Filed June 30, 1965, Ser. No. 468,308
8 Claims. (Cl. 104—100)

The present application is a continuation-in-part of my co-pending application, Ser. No. 277,854, filed May 3, 1963, now Patent No. 3,204,575, issued Sept. 7, 1965.

The present invention relates to overhead rail systems and particularly to detachable means for effecting temporary connections between the rail system of a vehicle and that, for example, at a store or warehouse.

It is a common practice to provide vehicles, warehouses, and stores with overhead rail systems to enable products, of which meat is a good example, to be handled with relative ease and convenience, particularly when the system of a vehicle can be connected to the system at the store or warehouse.

The provision of means for detachably interconnecting such systems is the general objective of this invention and, in accordance therewith, that objective is attained by providing a connecting rail with a link pivoted to enable the connecting rail to be swung upwardly or downwardly and detachably connected to a mount secured to the supporting structure at the loading and unloading end of the overhead rail system of the vehicle. A further objective is to provide a connection between the mount and the supporting structure that is pivoted to enable the link and the connecting rail to be turned from side-to-side thus to ensure that the rail system of the vehicle and that at the store or warehouse can always be properly related.

A further objective of the invention is to provide the mount with an upwardly opening socket, the link with a depending member entrant thereof, and a lock operable to prevent its accidental escape from the socket.

In the accompanying drawings, there are shown illustrative embodiments of the invention from which these and other of its novel features and advantages and other objectives of the invention will be readily apparent.

Figure 2:
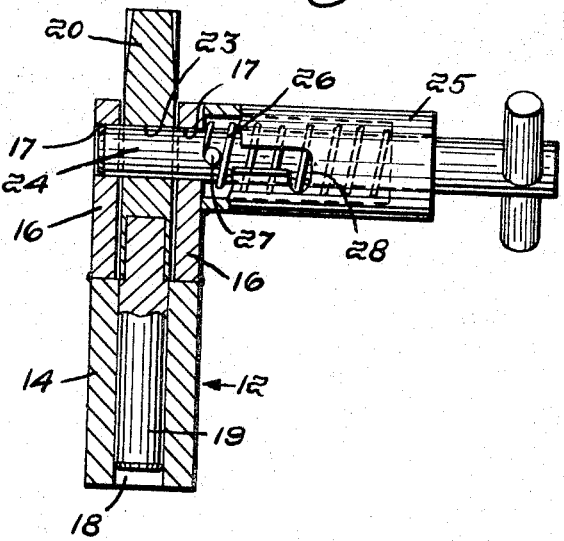

In the drawings:

FIGURE 1 is a fragmentary perspective view of the end of a loading and unloading rail of an overhead rail system of a vehicle with a connecting rail attached thereto, FIGURE 2 is a section taken approximately along the indicated lines 2—2 of FIGURE 1, FIGURE 3 is a fragmentary perspective view similar to FIGURE 1 but illustrating another embodiment of the invention, FIGURE 4 is a section taken approximately along the indicated lines 4—4 of FIGURE 3, and FIGURE 5 is a section taken approximately along the indicated lines 5—5 of FIGURE 4.

In the embodiment of the invention illustrated by FIGURES 1 and 2, the loading and unloading rail of an overhead rail system of a truck body is indicated at 10. The rails of the system support and guide conventional wheeled carriers, not shown, but which are of the type shown in the above referred to application and also in my co-pending application, Ser. No. 311,730, filed Sept. 26, 1963, now Patent No. 3,212,452, issued Oct. 19, 1965. The rail 10 is shown as projecting upwardly along one edge of a supporting beam 11 and its loading and unloading end is shown as projecting beyond the corresponding end thereof.

At the loading and unloading end of the rail 10, there is a generally indicated mount 12 including a section 13 secured to the end of the beam 11 and a section 14 connected to the section 13 by the vertical pivot 15 which enables the section 14 to be swung from side-to-side.

The section 14 has a vertically disposed yoke 16 having transversely alined bores 17 in which there is a vertical bore 18 providing an upwardly opening socket dimensioned to receive a pin 19 depending from a link 20. The link 20 is attached by a transverse pivot 21 to the connecting rail 22 to permit it to be swung upwardly or downwardly relative to the link 20, when the link 20 is attached to the mount, as may be required in connecting the rail system of the truck to the rail system at the store or warehouse. The axis of the pivot 15 is at the junction of the link 20 and the free end of the rail 10.

The link 20 has a bore 23 to receive the transverse yoke pin 24 slidably guided by a sleeve 25 fixed on one side of the yoke 16 in registry with a bore 17 and urged into a position locking the link 20 to the yoke 16 by a spring 26 yieldably opposing the withdrawal of the pin 24 from the link bore 23 and the yoke bores 17. The pin 24 has a projection 27 in the bayonet 28 by which the pin 24 may be locked in its retracted position.

In the embodiment of the invention illustrated by FIGURES 3-5, the loading and unloading rail of an overhead rail system of a truck body and its supporting structure are indicated at 10A and 11A, respectively. The supporting structure 11A is shown as having a projection 28 fitting the fork 29 at one end of the mount 30 and connected thereto by a vertically disposed pivot 31.

The mount 30 has a vertical upwardly opening socket 32 shown as square in cross section, and dimensioned to receive the similarly shaped member 33 depending from the link 34. The link 34 is connected to the connecting rail 35 by a transverse pivot 36.

The mount 30 has a transverse bore 37 intersecting one edge of the socket 32 and the depending member 33 has a channel 38 along its corresponding edge which registers therewith when the member 33 is seated therein, the adjacent ends of the rail 10A and the link 34 being substantially in the zone of the axis of the pivot 31. A locking pin 39, when inserted into the bore 37 is operative to lock the member 33 against being unseated. In practice, the pin 38 has a handle 40 and a latch 41 disposed to be held by the bracket 42 to prevent pin withdrawal unless the pin 39 is first turned sufficiently so that the latch 41 clears the bracket 42.

From the foregoing, it will be apparent that the invention provides easily operated, rugged, and secure means for interconnecting the overhead rail systems of vehicles and warehouses and stores. With the mounts attached to the rail supporting structure at the free ends of the loading or unloading rails, the links of the connecting rails may be quickly, easily and securely attached and the pivotability of the connecting rails vertically with respect to their links and of the mounts laterally relative to the end of the loading and unloading rail ensure adaptability to a wide range of conditions.

I claim:

1. In an overhead rail system, a longitudinal rail having a loading and unloading end, said rail including supporting structure, a connecting rail including a vertically pivotable end link, and supporting means detachably connecting said link to said structure, said supporting means including a vertical pivotal connection with said structure, and a separable connection with said link holding said link against turning relative to said supporting structure.

2. In an overhead rail system, a longitudinal rail having a loading and unloading end, said rail including supporting structure, a connecting rail including a vertically pivotable end link, and supporting means detachably connecting said link to said structure, said supporting means including a vertical pivotal connection with said structure and a separable connection with said link holding said link against turning relative to said supporting structure, and releasable locking means holding said means and said link against separation.

3. In an overhead rail system, a longitudinal rail having a loading and unloading end, said rail including supporting structure, a connecting rail including a vertically pivotable end link, and supporting means detachably connecting said link to said structure, said supporting means including a connection with said structure and an upwardly opening socket, said link including a depending member entrant of said socket, said depending member and said socket being dimensioned to remain connected through substantial vertical movement of said link relative to said supporting means, and said connection holding said link against turning relative to said supporting structure.

4. In an overhead rail system, a longitudinal rail having a loading and unloading end, said rail including supporting structure, a connecting rail including a vertically pivotable end link, including a depending pin, supporting means detachably connecting said rail to said structure, said supporting means including a pair of sections, a vertical pivot interconnecting said sections, one section attached to said structure and the other including a yoke receiving said end link of said unloading rail, and having an upwardly opening, vertical bore to receive said pin, and a pin connecting said link to said yoke.

5. In an overhead rail system, a longitudinal rail having a loading and unloading end, said rail including supporting structure, a connecting rail including a vertically pivotable end link including a depending pin, supporting means detachably connecting said rail to said structure, said supporting means including a pair of sections, a vertical pivot interconnecting said sections, one section attached to said structure and the other including an upwardly disposed yoke receiving said end link of said unloading rail and having an upwardly opening, vertical bore to receive said pin, and a transverse pin connecting said link to said yoke.

6. In an overhead rail system, a longitudinal rail having a loading and unloading end, said rail including supporting structure, a connecting rail including a vertically pivotable end link, and supporting means detachably connecting said link to said structure, said supporting means comprising a mount, a vertical pivot connecting said mount to said structure and having an upwardly opening socket, and said link including a depending member entrant of said socket, said member and said socket being of a cross sectional size and shape providing means to hold said link from turning relative to said supporting means.

7. The system of claim 6 in which the socket and the depending member are both of the same rectangular cross sectional shape, the mount having a transverse bore intersecting the socket at one side, the depending member having a channel at one side registering with the transverse bore when seated thereon, and the lock is a rotatable pin extending through the bore and partly within the channel and provided with a handle, and the mount has a pivotable bracket holding the pin handle against withdrawal until turned out of engagement therewith.

8. In an overhead rail system, a longitudinal rail having a loading and unloading end, said rail including supporting structure, a connecting rail including a vertically pivotable end link, and a mount, a transversely pivotable connection between said mount and said structure, said mount having an upwardly opening socket, said link including a depending member entrant of said socket with the free end of the link closely adjacent the end of said longitudinal rail, the axis of said pivotable connection being approximately inclusive of said ends, and means to hold the link from turning relative to said mount.

References Cited

UNITED STATES PATENTS

| | | | |
|---|---|---|---|
| 440,907 | 11/1890 | Wetzler | 104—91 |
| 451,602 | 5/1891 | Richardson | 104—96 |
| 994,461 | 6/1911 | Harding | 104—96 |
| 1,180,080 | 4/1916 | Rothe | 104—99 |
| 1,341,996 | 6/1920 | Plucienski | 104—91 |
| 1,391,126 | 9/1921 | Lambert | 104—93 |
| 1,435,608 | 11/1922 | Judd | 104—99 |
| 1,690,502 | 11/1928 | Raymond | 104—101 |
| 1,729,449 | 9/1929 | Nagy | 104—93 |
| 1,878,605 | 9/1932 | Schmidt et al. | 104—101 |
| 2,223,275 | 11/1940 | Valenzuela | 105—366 |
| 2,351,314 | 6/1944 | Ario | 296—35 |
| 2,832,298 | 4/1958 | Ambli | 104—96 |
| 3,011,455 | 12/1961 | Heimann | 104—96 |
| 3,063,383 | 11/1962 | Toennies | 104—99 |
| 3,065,993 | 11/1962 | Schramm | 298—17 |
| 3,102,496 | 9/1963 | Price | 104—98 |
| 3,104,621 | 9/1963 | Withers | 104—99 |

ARTHUR L. LA POINT, *Primary Examiner.*

H. BELTRAN, *Assistant Examiner.*